United States Patent
Kim

[11] Patent Number: 5,993,650
[45] Date of Patent: Nov. 30, 1999

[54] GRANULAR CARRIER FOR TREATING SEWAGE OR WASTE WATER, METHOD FOR PRODUCING THE SAME AND APPARATUS FOR TREATING SEWAGE OR WASTE WATER BY USING THE GRANULAR CARRIERS

[75] Inventor: Hai-Soo Kim, Seoul, Rep. of Korea

[73] Assignee: Sam Kwang Aqua-Clear, Inc., Rep. of Korea

[21] Appl. No.: 08/964,821

[22] Filed: Nov. 5, 1997

Related U.S. Application Data

[62] Division of application No. 08/738,055, Oct. 25, 1996.

[30]      Foreign Application Priority Data

Oct. 27, 1995  [KR]  Rep. of Korea ....................... 95/37619
Mar. 20, 1996  [KR]  Rep. of Korea ....................... 96/7486

[51] Int. Cl.⁶ ............................................... C02F 3/06
[52] U.S. Cl. .......................... 210/150; 210/194; 210/197
[58] Field of Search ..................................... 210/150, 151, 210/194, 220, 195.4, 197

[56]              References Cited

U.S. PATENT DOCUMENTS

| | | | |
|---|---|---|---|
| 4,482,458 | 11/1984 | Rovel et al. | 210/150 |
| 4,707,252 | 11/1987 | Durot et al. | 210/151 |
| 4,834,872 | 5/1989 | Overath | 210/151 |
| 4,931,183 | 6/1990 | Klein et al. | 210/151 |
| 4,954,257 | 9/1990 | Vogelpohl et al. | 210/151 |
| 5,441,634 | 8/1995 | Edwards | 210/194 |

*Primary Examiner*—Christopher Upton
*Attorney, Agent, or Firm*—Perman & Green, LLP

[57]                ABSTRACT

The present invention relates to a granular carrier and a method for producing the same, and to an apparatus for treating sewage or waste water by using the granular carriers. The granular carrier comprises a tire powder of 100 parts by weight, an EVA or its derivative of 30 to 50 parts by weight, and an activated carbon or inorganic micropowder equivalent thereto of 5 to 15 parts by weight. The granular carriers producing method comprises the steps of: mixing a tire powder of 100 parts by weight and an EVA or resin of 30 to 50 parts by weight, resolving the EVA or its derivative of the mixture at a temperature of 100 to 250° C., bonding an activated carbon to the tire powder, extruding the mixture, cutting the mixture extruded, and attaching the activated carbon powder to the EVA or its derivative dissolved on the surface of the cut part of the mixture. The sewage or waste water treatment apparatus is also disclosed.

10 Claims, 4 Drawing Sheets

GRANULAR CARRIER FOR TREATING SEWAGE OR WASTE WATER, METHOD FOR PRODUCING THE SAME AND APPARATUS FOR TREATING SEWAGE OR WASTE WATER BY USING THE GRANULAR CARRIERS

This is a divisional of copending application Ser. No. 08/738,055 filed on Oct. 25, 1996.

FIELD OF THE INVENTION

The present invention relates to a granular carriers and a method for producing the same, and to an apparatus for treating sewage or waste water by using the granular carriers.

DESCRIPTION OF THE PRIOR ART

Generally, as a microorganism fixing carrier for treating organisms, a granular carrier with a small specific surface or a coated granular carrier has been utilized in practice. The granular carrier and inorganic powder are required to have a great intensity and a great attaching intensity, respectively.

However, in the prior art, since the specific surface of the granular carrier is small, the number of the microorganisms attached thereto is reduced. In case that the granular carrier has a large specific surface, during a prolonged aeration, the attached inorganic powder is separated from the carrier. Particularly, in case of treating certain industrial waste water, the carrier is worn out due to the hot waste water and mechanical shocks so that the specific surface of the carrier is not sufficiently utilized, the control of the size thereof within a desired range is difficult and the techniques for controlling the temperature and moisture in a reaction chamber is required.

Furthermore, as a method for treating indissoluble waste water of high density, an activated sludge treatment method has been widely used. The activated sludge treatment method resolves polluters dissolved in the waste water by using only sludge microorganisms in an aeration tank. However, since a quantity of mixed liquid suspended solids ("MLSS") in the aeration tank is about 2,000 to 3,000 mg/L, the treatment time is increased, thereby an amount of air to be consumed becomes larger, resulting in a larger air generating arrangement for injecting air artificially. In order to get a large amount of air with a low cost, the activated sludge treatment method employs a root blower instead of a compressor which results in a high cost. Pressure of the root blower is limited to a range of 0.5 to 0.6 $Kg/Cm^2$, thereby the height of a water tank is restricted to a range of about 4 to 6 meters. Under the above condition, since only 3 to 7% of oxygen supplied is dissolved in the water, a large amount of air must be required.

As described above, in the prior art, it is difficult to control within a desired range the grain size of the carriers for treating sewage or waste water and to produce the carriers. In addition, the sewage or waste water treatment apparatus requires a large amount of air, thereby resulting in a high cost.

SUMMARY OF THE INVENTION

It is, therefore, a primary object of the invention to provide a granular carrier having a great mechanical wear-resistance, a great chemical-resistance, a high intensity, a high inorganic powder attachment intensity, and an increased specific surface, thereby allowing a great number of microorganisms to attach to the surface thereof, resulting in a high speed treatment of sewage or waste water.

It is another object of the invention to provide a method in which a ratio of components to be mixed and the size and specific gravity of granular carrier can be adjusted with ease so that the requirements for various uses can be achieved with ease and yield is considerably increased.

It is still another object of the invention to provide an apparatus for treating sewage or waste water by using the above granular carriers, the apparatus treating the sewage or waste water rapidly by the granular carriers being once projected and circulated in a treatment tank without any change thereof, thereby increasing the treatment efficiency thereof.

In accordance with an aspect of the present invention, there is provided a granular carrier for treating sewage or waste water, comprising: a tire powder of 100 parts by weight; an ethylene vinylacetate copolymer ("EVA") or its derivative of 30 to 50 parts by weight, the EVA or its derivative which serves as a bonding agent having hydrophilicity and bonding force chemically stable, the EVA or its derivative being insoluble at a high temperature; and an activated carbon or inorganic micropowder equivalent thereto of 5 to 10 parts by weight.

In accordance with another aspect of the present invention, there is provided a method of producing granular carriers for treating sewage or waste water, which comprises the steps of: mixing a tire powder of 100 parts by weight and an EVA or resin of 30 to 50 parts by weight, the resin having bonding force and hydrophilicity equivalent to that of the EVA; resolving the EVA or its derivative of the mixture at a temperature of 100 to 250° C.; bonding an activated carbon to the tire powder; extruding the mixture through an extrusion machine; cutting the mixture extruded from the extrusion machine; and attaching the activated carbon powder to the EVA or its derivative dissolved on the surface of the cut part of the mixture.

In accordance with still another aspect of the present invention, there is provided an apparatus for treating sewage or waste water by using a plurality of granular carriers, which comprises: an outer housing; an inner case disposed in the outer housing; a supplier for supplying the sewage or waste water, the supplier being installed on top of the outer cylinder; a granular carrier separating duct for removing bubbles attached to the granular carriers therefrom and guiding the granular carriers downwardly, the granular carrier separating duct being located on top of the inner cylinder; an outlet duct for discharging the treated sewage or waste water, the outlet duct being disposed on top of the granular carrier separating duct; an inner and an outer air injection pipes for injecting air into the inner case and the outer housing, respectively, the inner and an outer air injection pipes being spaced apart form each other vertically; a compressed air injection duct for injecting the compressed air into the outer housing, the compressed air injection duct being located under the inner case; an overflow duct for overflowing the sewage or waste water, the overflow duct being disposed over the granular carrier separating duct; a guiding duct for guiding the sewage or waste water overflowed to the outlet duct; and a slant member for guiding the flow direction of sewage or waste water and granular carriers.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Experiment 1

Figure 1:
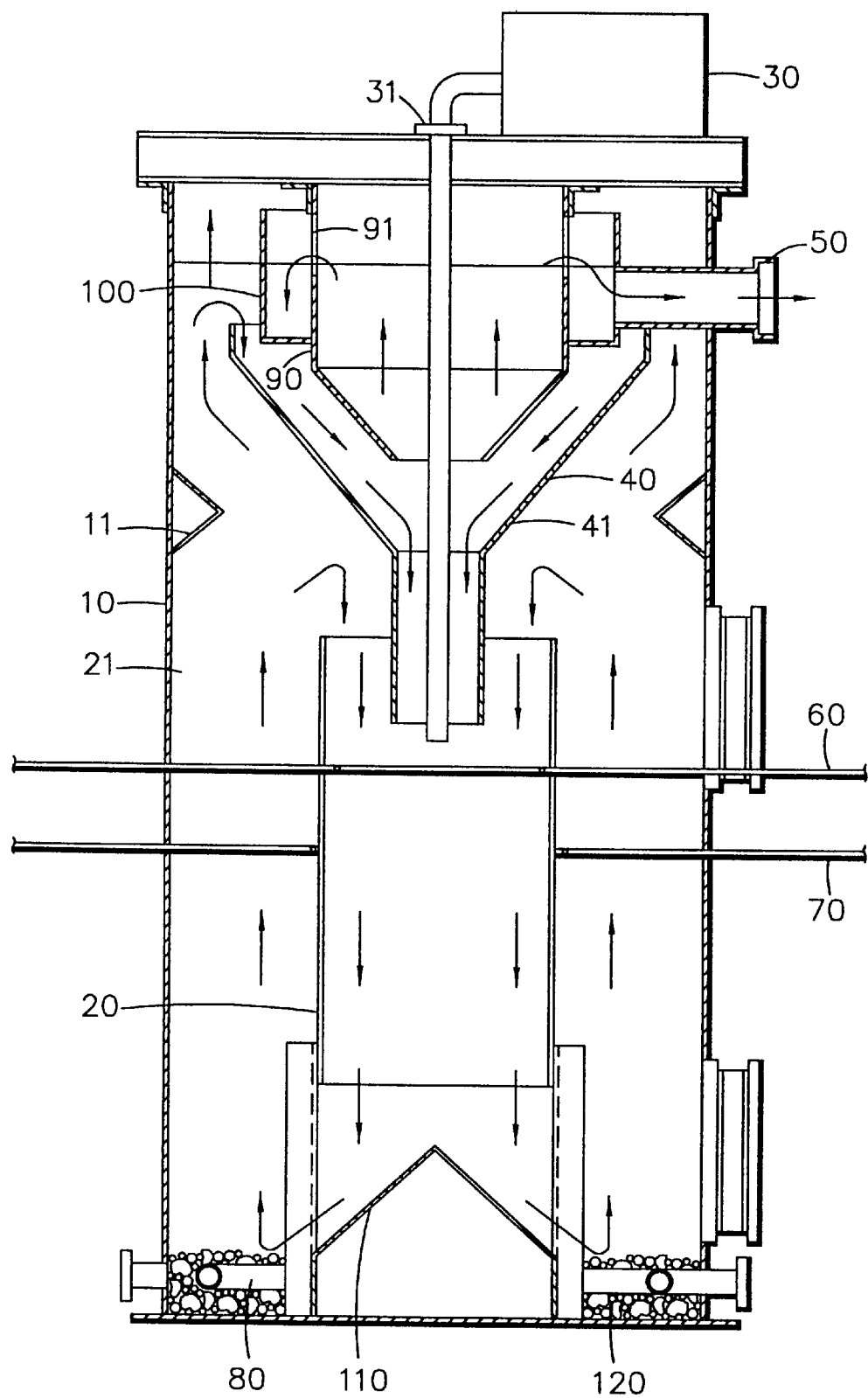
FIG. 1 represents a cross-sectional side elevational view of a sewage or waste water treating apparatus of the present invention.

Tire powder of 100 parts by weight with a particle size of 0.2 to 3 mm, EVA or its derivative of 30, 40 or 50 parts by weight, and activated carbon micropowder of 10 parts by weight with a grain size of 200 mesh are mixed by using a mixer. The mixture is heated to a temperature of about 170° C. to completely resolve the EVA or its derivative, and is, then, put into an extrusion machine.

The mixture extruding through an exit of the extrusion machine was cut into a number of granular carriers with a uniform size, and activated carbon powder is attached to the EVA or its derivative dissolved on the surface of the cut granular carrier due to the remaining heat thereof, thereby granular carriers with a large specific surface are produced.

Average size of the granular carriers produced according to the above was 2 to 11 mm and yield was more than 97%. Furthermore, as a result of digesting or dipping the granular carriers, 70% of the carriers was digested after 7 hours and all of the carriers after 20 hours. The results were as follows:

Table 1

Experiment 1

Specific Gravity Depending on a Ratio of Components

TABLE 1

<Experiment 1> specific gravity depending on a ratio of components

|  | Example 1 | Example 2 | Example 3 |
| --- | --- | --- | --- |
| tire powder (part by weight) | 100 | 100 | 100 |
| EVA (part by weight) | 30 | 40 | 50 |
| activated carbon (part by weight) | 10 | 10 | 10 |
| actual specific gravity | 1.13 | 1.09 | 1.06 |
| sedimentation velocity (Cm/sec) | 6.5 | 6.6 | 6.6 |

Table 2

Experiment 2

Properties Depending on Particle Size

TABLE 2

<Experiment 2> properties depending on particle size

| exit diameter of extrusion machine (mm) | 6 | 8 | 10 |
| --- | --- | --- | --- |
| average particle diameter of carriers (mm) | 7.1 | 9.3 | 11.7 |
| yield (average ± 3 mm) | more than or equal to 99% | more than or equal to 99% | more than or equal to 99% |
| apparent specific gravity | 0.52 | 0.46 | 0.43 |
| specific surface (m²/m³) | more than or equal to 1700 | more than or equal to 1500 | more than or equal to 1400 |

EXAMPLE 2

Tire powder of 100 parts by weight with a particle size of 0.2 to 3 mm, EVA or its derivative of 30, 40 or 50 parts by weight are mixed by using a mixer, and then, the mixture is heated to a temperature of about 170° C. to completely resolve the EVA or its derivative and is put into an extrusion machine. The extrusion machine had an exit with a diameter of 8 mm and the extrusion temperature was maintained at 120° C. At that time, the mixture was extruded linear shape and thus extruded linear mixture, then, passes through a water tank in which activated carbon powder of 200 mesh was dissolved so that the activated carbon was attached to the EVA or its derivative dissolved on the surface of the mixture due to the remaining heat thereof. Then, the mixture was quickly cooled by passing through another water tank in which cold water was stored, thereby the activated carbon is attached to the surface of the mixture. The cooled and coated linear mixture was guided into a cutter, being cut into a number of granular carriers; with a uniform size. Average size of the granular carriers produced was 9.8 mm and yield was more than 99%. Furthermore, as a result of digesting the granular carriers, 70% of the carriers was digested after 7 hours and all of the carriers after 20 hours.

An apparatus for treating sewage or waste water by using the above granular carriers produced according to the present invention will now be described with reference to FIGS. 1 to 3.

Figure 2:
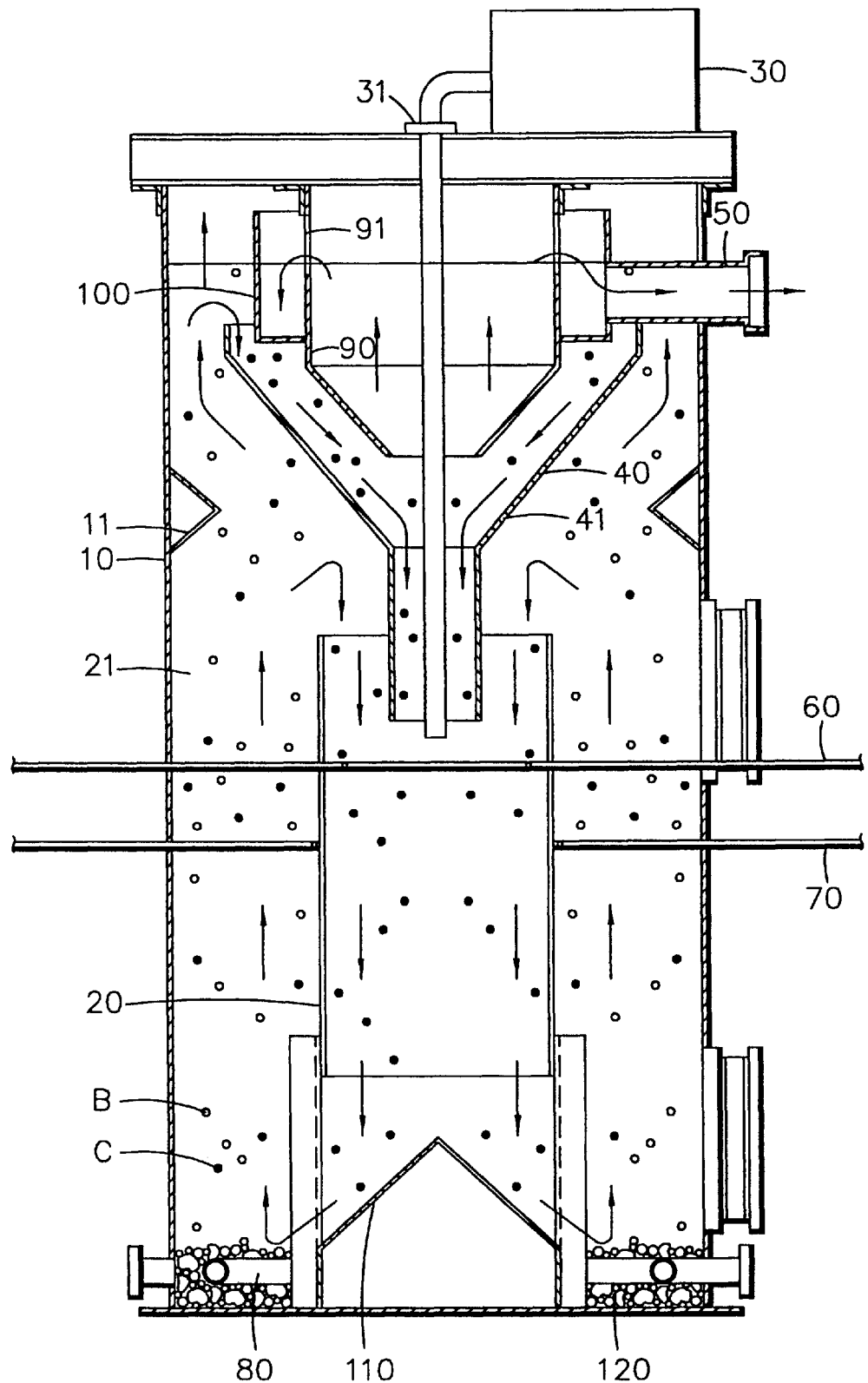
FIG. 2 depicts a cross-sectional side elevational view of the apparatus in FIG. 1, showing the granular carriers and the bubbles which are floating in the apparatus.

The apparatus of the present invention, as shown in FIG. 1, comprises an outer cylinder 10, an inner cylinder 20 disposed in the outer cylinder 10, a supplier 30 for supplying the sewage or waste water, the supplier 30 being installed on top of the outer cylinder 10, a funnel-shaped duct 40 for removing bubbles attached to the granular carriers therefrom and guiding the granular carriers downwardly, the funnel-shaped duct 40 being located on top of the inner cylinder 20, an outlet duct 50 for discharging the treated sewage or waste water, the outlet duct 50 being disposed on top of the funnel-shaped duct 40, an inner and an outer air injection pipes 60 and 70 which are spaced apart form each other vertically, a compressed air injection duct 80, the compressed air injection duct 80 being located under the inner cylinder 20, an overflow duct 90 for overflowing the sewage or waste water, the overflow duct 90 being disposed over the funnel-shaped duct 40, a guiding duct 100 for guiding the sewage or waste water overflowed to the outlet duct 50, and a slant member 110 for guiding the flow of sewage or waste water and granular to the outer cylinder 10.

The outer cylinder 10 has a height of 10 to 15 meters, thereby increasing the treatment efficiency. The outer cylinder 10 is provided with an annular protuberance 11 formed, at a certain position, on the inner surface thereof.

The annular protuberance 11 prevents the sewage or waste water and the granular carriers from lifting, thereby allowing them to circulate.

The inner cylinder 20 is located in the outer cylinder 10 to define a space 21 therebetween, wherein the sewage or waste water, together with the air injected from the inner and the outer air injection pipes 60 and 70, flows downwardly.

The supplier 30 is disposed on top of the outer cylinder 10, and an inlet conduit 31 with a certain length extends from the supplier 30 to the inside of the inner cylinder 20, passing through the funnel-shaped duct 40. The sewage or waste water is supplied through the inlet conduit 31.

The funnel-shaped duct 40 has a converging portion 41 and the overflow duct 90 has an aperture 91 through which the treated sewage or waste water is overflowed into the guide duct 100. The outlet conduit 50 is connected to and is in communication with the guide duct 100.

Figure 3A:
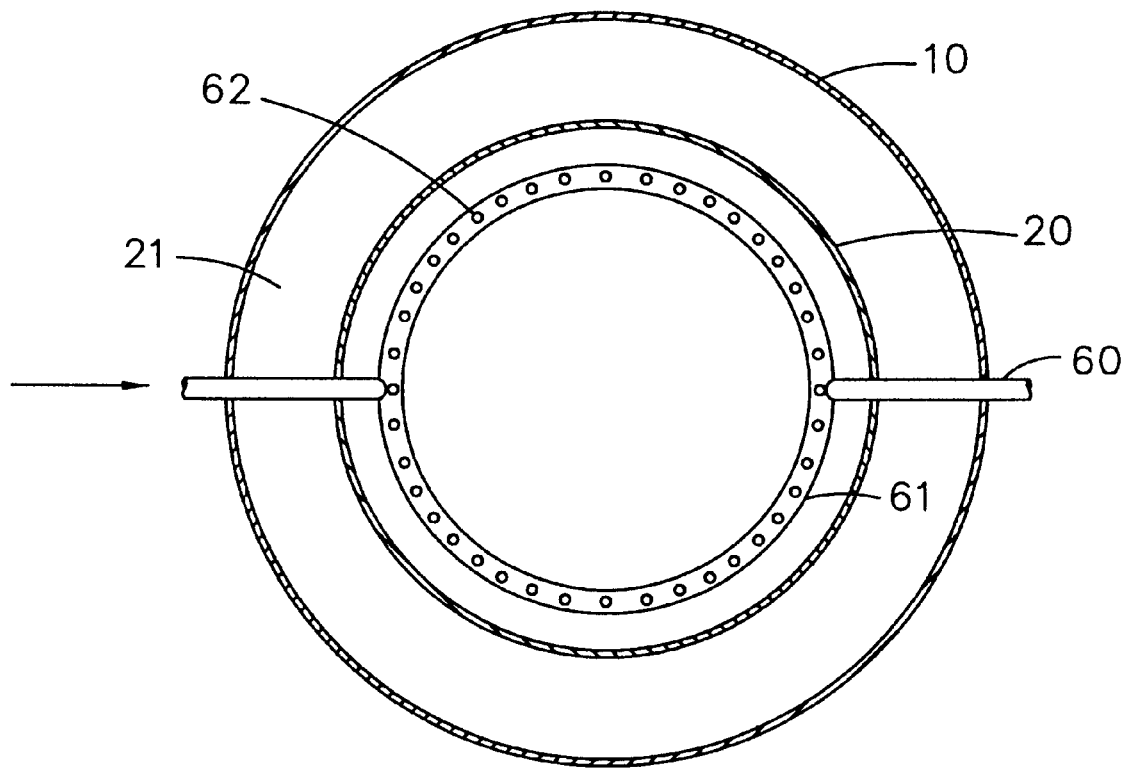
FIGS. 3A and 3B set forth transverse-sectional top views of the apparatus in FIG. 1, showing the inner and the outer air injection pipes, respectively.
Figure 3B:
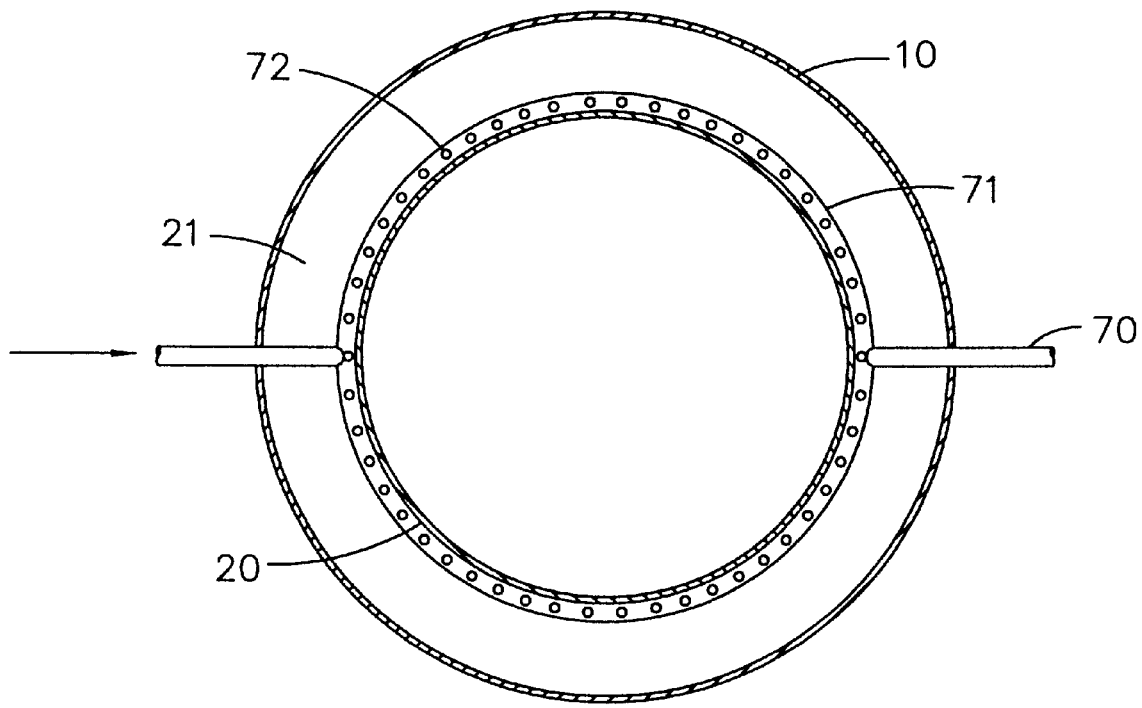

Referring to FIGS. 3A and 3B, the inner and the outer air injection pipes 60 and 70, respectively, have an inner and an outer annular portion 61 and 71 each of which is provided with a plurality of air vents 62 and 72 through which air is injected. The inner air injection pipe 60 passes through the outer cylinder 10 and the inner cylinder 20, and the annular portion 61 is positioned in the inner cylinder 20. The outer air injection pipe 70 passes through the outer cylinder 10, and the annular portion 71 is positioned around the inner cylinder 20. It does not matter whether the air vents 62 and 72 are formed such that the air is injected upwardly or downwardly.

Referring back to FIGS. 1 and 2, the compressed air injection duct 80 is disposed under the inner cylinder 20. The compressed air injection duct 80 injects upwardly the compressed air which intermittently flows therein from a compressor (not shown), thereby lifting the depositing polluters and granular carriers.

Furthermore, the slant member 110 is located inside of the compressed air injection duct 80, guiding the flow of sludge and granular carriers. The slant member 110 has a cone-shaped portion, thereby uniformly supplying the fluid into the space 21.

Pebble layer 120 is formed around the compressed air injection duct 80, prevents various polluters from entering the duct 80, breaks the bubbles generated in pieces, thereby facilitating the floating of polluters and granular carriers.

Operation of the apparatus of the present invention will now be described.

Sewage or waste water supplied through the supplier 30 flows downwardly through the inlet conduit 31 and the inner cylinder 20 and, then, flows upwardly through the space 21 between the inner cylinder 20 and the outer cylinder 10. At this time, the air injected through the air vents 62 of the inner air injection pipe 60 floats sludge. In addition, the air injected through the air vents 72 of the outer air injection pipe 70 floats the sewage or waste water in the space 21. On the other hand, since the sectional area of the space 21 is larger than that of the inner cylinder 20, the sewage or waste water in the inner cylinder 20 flows about 4 or 5 times as fast as that in the space 21 and flows, therefore, faster than the floating air therein. Therefore, the air injected through the inner air injection pipe 60 once flows downwardly and then lifts along the space 21, thereby facilitating the circulation of sewage or waste water.

The volume of the descending air becomes less and less due to the water pressure and that of the ascending air becomes greater and greater, thereby increasing the role of air-lift. Since water pressure at bottom is about 1 to 1.5 Kg/Cm$^2$, the air transmitting effect is relatively increased. The granular carriers C of the present invention described hereinbefore are previously put into the space 21, floating in the sewage or waste water, thereby the microorganisms attached to the granular carriers C treat the polluters in the sewage or waste water. That is to say, the granular carriers C floating in the sewage or waste water treat and purify the sewage or waste water, while circulating along with the sewage or waste water.

During the above process, bubbles B generated due to the air injected into the space 21, are combined together while lifting, and burst at the surface of the water. On the other hand, some of the bubbles B are attached to the granular carriers C, thereby lifting the granular carriers C. Since the upper portion area of the space 21 becomes less due to the converging portion of the funnel-shaped duct 40, collisions among the granular carriers C is increased so that the bubbles B attached thereto are separated from the granular carriers B, thereby resulting in vibrations. Therefore, the floating fine bubbles burst due to the above vibrations.

The granular carriers C from which the bubbles B are removed descend along the inner surface of the converging portion 41 of the funnel-shaped duct 40, being sucked into the inside of the inner cylinder 20.

While resolving various sewage or waste water, microorganisms attached to the granular carriers C get grow. The floating granular carriers C collide with one another, are partly cut out, and, then, descend along the converging portion 41 of the funnel-shaped duct 40, thereby the size thereof is kept constant. Since being light, the dissolved sludge is discharged together with the treated water, in turn, through the overflow duct 90, the guide duct 100 and the outlet conduit 50. After the discharged sewage or waste water is stored in a settling tank (not shown) during a certain period of time, the dissolved sludge is settled, thereby resulting in purified water.

On the other hand, the compressed air injection duct 80 injects compressed air intermittently, to thereby lift the depositing sludge and granular carriers. The pebble layer 120 with a height of about 10 to 20 cm is provided around the compressed air injection duct 80, thereby making easy the lifting of polluters and granular carriers C. In addition, since the injected compressed air strikes the pebbles 120, the ratio of dissolved oxygen is increased. Furthermore, the polluters and the granular carriers C do not deposit on the bottom of the outer cylinder 10, thereby preventing the air vents of the compressed air injection duct 80 from being choked.

The test results of the apparatus of the present invention were as the following tables 3 and 4.

Table 3

Treatment of Living Waste Water

TABLE 3

| | Treatment of living waste water | | |
|---|---|---|---|
| | activated sludge treatment method | apparatus with 10m of effective water depth | apparatus with 15m of effective water depth |
| waste water amount (m$^3$/day) | 120000 | 120000 | 120000 |

TABLE 3-continued

Treatment of living waste water

| | activated sludge treatment method | apparatus with 10m of effective water depth | apparatus with 15m of effective water depth |
|---|---|---|---|
| treatment time (hour) | 6 | 1 | 1 |
| capacity of aeration tank ($m^3$) | 30000 | 5000 | 5000 |
| sludge microorganism amount (mg/L) | 2000–3000 | 15000–20000 | 15000–20000 |
| space load of BOD (BOD $Kg/m^3/day$) | 0.8 | 4.8 | 4.8 |
| F/M ratio | 0.27–0.40 | 0.24–0.32 | 0.24–0.32 |
| BOD of waste water (mg/L) | 150–250 | 150–250 | 150–250 |
| BOD of treated water (mg/L) | 10–25 | 10–20 | 10–20 |
| treatment rate (%) | 87–92 | 88–95 | 88–95 |
| oxygen consumption amount ($KgO_2/day$) | 7537.5 | 7537.5 | 7537.5 |
| required air amount ($Nm^3/day$) | 777463 | 388732 | 340134 |
| require air amount ($Nm^3/min$) | 540 | 270 | 237 |
| site area required for installation ($m^2$) | 7500 | 500 | 334 |

*F/M ratio means that the ratio of food(contaminant) to microorganism

Table 4

Treatment of Indissoluble Waste Water of Papermaking

TABLE 4

Treatment of indissoluble waste water of papermaking

| | activated sludge treatment method | apparatus with 10m of effective water depth | apparatus with 15m of effective water depth |
|---|---|---|---|
| waste water amount ($m^3/day$) | 10000 | 10000 | 10000 |
| treatment time (hour) | 24 | 4 | 4 |
| capacity of aeration tank ($m^3$) | 10000 | 1667 | 1667 |
| sludge microorganism amount (mg/L) | 2000–3000 | 15000–20000 | 15000–20000 |
| space load of COD (COD $Kg/m^3/day$) | 0.4 | 2.4 | 2.4 |
| F/M ratio | 0.13–0.20 | 0.12–0.16 | 0.12–0.16 |
| COD of waste water (mg/L) | 350–450 | 350–450 | 350–450 |
| COD of treated water (mg/L) | 30–50 | 25–45 | 25–45 |
| treatment rate (%) | 86–93 | 90–94 | 90–94 |
| oxygen consumption amount ($KgO_2/day$) | 2475 | 2475 | 2475 |
| required air amount ($Nm^3/day$) | 255287 | 127644 | 111688 |
| required air amount ($Nm^3/min$) | 178 | 89 | 78 |
| site area required for installation ($m^2$) | 2500 | 168 | 112 |

*F/M ratio means that the ratio of food(contaminant) to microorganism

As seen from the table 3, in case of treating living waste water in which biochemical oxygen demand ("BOD"+ was 150 to 250 mg/L (average: 200 mg/L) and the generating amount thereof was 120000 $m^3/day$, the waste water was treated for 6 hours by using the standard activated sludge treatment method and the treatment rate was about 90%. The capacity of aeration tank was 30000 $m^3$. Therefore, the space loads of BOD was 0.8 $Kg/m^3/day$ and F/M ratio was 0.27 to 0.40. In order to install such aeration tank, a site with an area of 7500 $m^2$ was required. However, in case of using the apparatus of the present invention with an effective depth of water of 10 meters, although F/M ratio was 0.24 to 0.32 as similar as that of the activated sludge treatment method, the volume of aeration tank was reduced to 5000 $m^3$, a sixth of that in the activated sludge treatment method, and the space loads of BOD was 4.8 $Kg/m^3/day$, 6 times of that in the activated sludge treatment method. Therefore, the site area required to install the aeration tank was 500 $m^2$, a fifteenth of that in the activated sludge treatment method.

In case of using the apparatus of the present invention with an effective depth of water of 15 meters, the site area required to install the aeration tank was reduced to 324 $m^2$. while the other items are similar to those in the apparatus with 10 meters of effective water depth. Although the oxygen consumption amount was 7537.5 $KgO_2/day$ in all of the above cases, the amount of air required was significantly different. That is to say, in the apparatus with 10 meters of effective water depth, the amount of air required was 270 $Nm^3/min$, a half of that in the activated sludge treatment method. In addition, in the apparatus with 15 meters of effective water depth, the amount of air required was 237 $Nm^3/min$, 43.9% of that in the activated sludge treatment method.

On the other hand, as seen in the table 4, in case of treating indissoluble waste water of paper making in which chemical oxygen demand ("COD") was 350 to 450 mg/L (average: 400 mg/L) and the producing amount thereof was 10000 $m^3/day$, the waste water was treated for 24 to 30 hours by using the standard activated sludge treatment method and the treatment rate was about 90%. The capacity of aeration tank was 10000 $m^3$. Therefore, the space loads of COD was 0.4 $Kg/m^3/day$ and the F/M ratio was 0.13 to 0.20. In order to install such aeration tank, a site with an area of 2500 $m^2$ was required.

However, in case of using the apparatus of the present invention with an effective depth of water of 10 meters, although the F/M ratio was 0.12 to 0.16 as similar as that of the activated sludge treatment method, the volume of aeration tank was reduced to 1667 m², a sixth of that in the activated sludge treatment method, and the space loads of COD was 2.4 Kg/m³/day, 6 times of that in the activated sludge treatment method. Therefore, the site area required to install the aeration tank was 168 m², a fifteenth of that in the activated sludge treatment method.

In case of using the apparatus of the present invention with an effective depth of water of 15 meters, the site area required to install the aeration tank was reduced to 112 m², while the other indexes are similar to those in the apparatus with 10 meters of effective water depth. Although the oxygen consumption amount was 2475 $KgO_2$/day in all of the above cases, the amount of air required was significantly different. That is to say, in the standard activated sludge treatment method, the amount of air required was 178 Nm³, in the apparatus with 10 meters of effective water depth, the amount of air required was 89 Nm³, a half of that in the activated sludge treatment method. In addition, in the apparatus with 15 meters of effective water depth, the amount of air required was 78 Nm³, 43.9% of that in the activated sludge treatment method.

As described above, the granular carrier of the present invention has a great mechanical wear-resistance and a great chemical-resistance. Therefore, the intensity of the granular carrier and the attachment intensity of the inorganic powder are increased so that, in an organism treatment apparatus, during an aeration, the attached inorganic powder is prevented from being removed. In case of treating certain industrial waste water, the carrier is not readily worn, even being subjected to the hot waste water and mechanical shocks, thereby sufficiently utilizing the specific surface of the carrier. Particularly, since a great number of microorganisms can be fixed to the surface of carrier by increasing the specific surface of carrier, it is possible to treat sewage or waste water in a shortened period of time. Furthermore, in the production of the carrier of the present invention, since a ratio of components to be mixed and the size and specific gravity of granular carrier can be adjusted with ease, the adjustment required for various uses becomes easier and yield is considerably increased.

In addition, according to the sewage or waste water treatment apparatus, the treatment is performed rapidly so that the treatment efficiency is increased.

Although the invention has been shown and described with respect to the preferred embodiments, it will be understood by those skilled in the art that various changes and modifications may be made without departing from the spirit and scope of the invention as defined in the following claims.

What is claimed is:

1. An apparatus for treating sewage or waste water by using a plurality or granular carriers, which comprises:

an outer housing defining an interior volume therewithin;

an inner case disposed in the interior volume of said outer housing;

a supplier for supplying the sewage or waste water, the supplier being installed on top of the outer housing;

a granular carrier separating duct for removing bubbles attached to the granular carriers therefrom and guiding the granular carriers downwardly the granular carrier separation duct being located on top of the inner case;

an outlet duct for discharging the treated sewage or waste water from said apparatus, the outlet duct being disposed on top of the granular carrier separating duct; inner and outer air injection pipes for injecting air into the inner case and the outer housing, respectively, the inner and an outer air injection pipes being spaced apart from each other vertically;

a lower compressed air injection duct for injecting the compressed air into the outer housing, the compressed air injection duct being located under the inner case;

an overflow duct for overflowing the sewage or waste water, the overflow duct being disposed over the granular carrier separating duct;

a guiding duct communicating with said overflow duct and said outlet duct for guiding the sewage or waste water overflowed to the outlet duct; and a slant member associated with the lower compressed air injection duct for guiding the flow direction of sewage or waste water and granular carriers.

2. The apparatus of claim 1, wherein the outer housing is of a cylindrical shape and is provided with an annular protuberance formed on the inner surface thereof.

3. The apparatus of claim 1, wherein the outer housing and the inner case define a space therebetween.

4. The apparatus of claim 1, wherein the supplier is disposed on top of the outer housing and an inlet conduit extends from the supplier to the inside of the inner case, passing through the granular carrier separating duct.

5. The apparatus of claim 1, wherein the granular carrier separating duct is of a funnel-shape and has a converging portion directed downwards.

6. The apparatus of claim 1, wherein the guide duct is in communication with the outlet conduit.

7. The apparatus of claim 6, wherein the overflow duct has an aperture through which the treated sewage or waste water overflows into the guide duct.

8. The apparatus of claim 1, wherein the inner air injection pipe passes through the outer housing and the inner case, the inner air injection pipe being provided with an inner annular portion positioned in the inner case, and the outer air injection pipe passes through the outer housing, the inner air injection pipe being provided with an outer annular portion positioned around the inner case.

9. The apparatus of claim 8, wherein the inner and the outer annular portions are each provided with a plurality of air vents through which air is injected.

10. The apparatus of claim 1, wherein the upper portion of the injection duct is provided with a pebble layer which is deposited on the bottom of the outer cylinder.

* * * * *